Feb. 12, 1952
W. R. TONGE ET AL
2,585,285
SEPARABLE FASTENING APPARATUS FOR
STRUCTURE WALL ATTACHMENTS
Filed Aug. 18, 1948
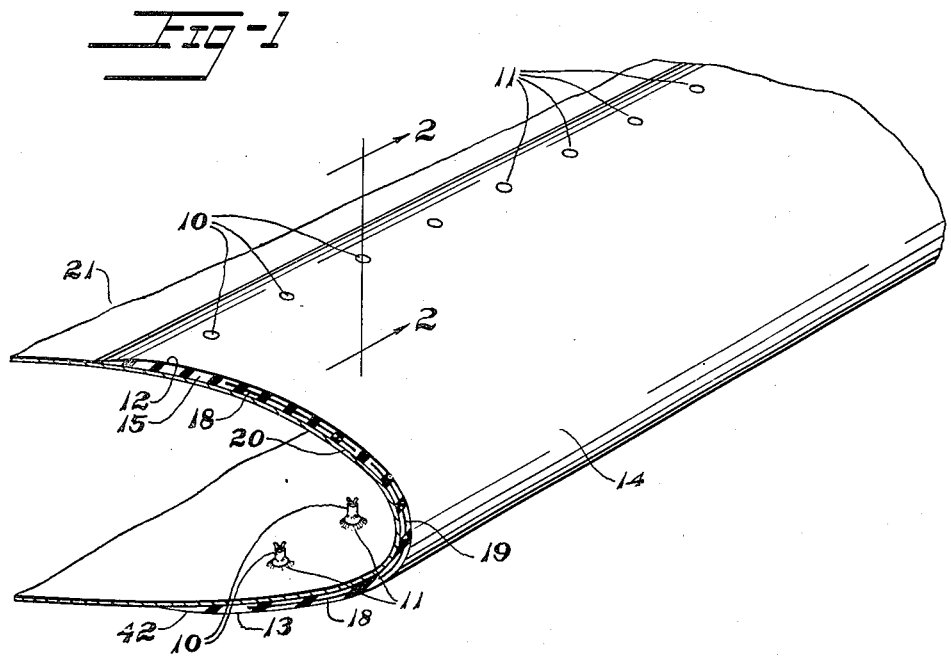
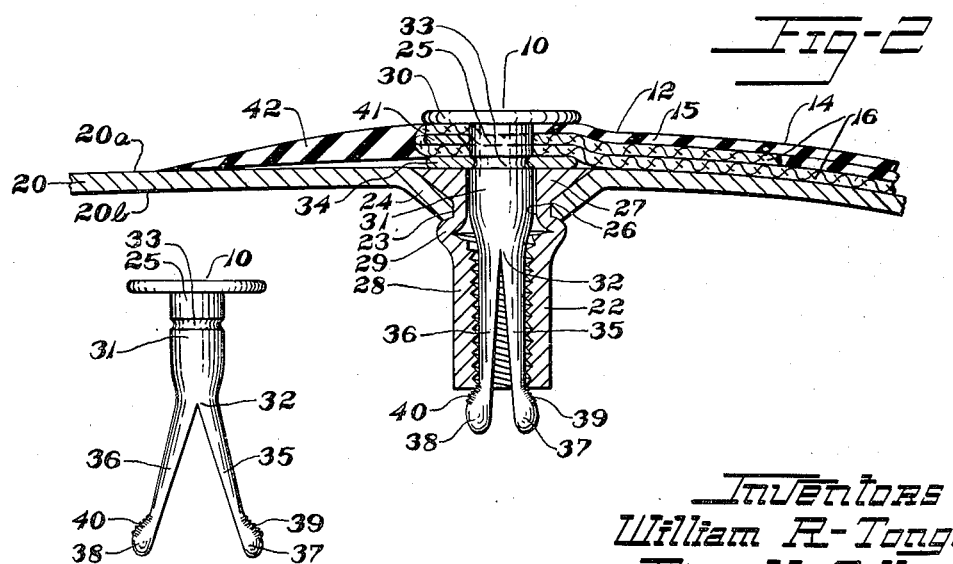
Inventors
William R. Tonge
Ray H. Gill
By Dwight L. Moody
Atty Patented Feb. 12, 1952

2,585,285

UNITED STATES PATENT OFFICE 2,585,285

SEPARABLE FASTENING APPARATUS FOR STRUCTURE WALL ATTACHMENTS

William R. Tonge and Ray H. Gill, Akron, Ohio, assignors to The B. F. Goodrich Company, New York, N. Y., a corporation of New York Application August 18, 1948, Serial No. 44,946

3 Claims. (Cl. 24—213)

The invention relates to separable fastening apparatus for attaching a structure or body to a wall, and especially to such apparatus for attaching in a quick-releasable manner an inflatable ice-removing covering to an aircraft surface such, for example, as the leading edge of a wing or other airfoil.

Prior marginal attachments of inflatable coverings of elastic construction have generally utilized screw fasteners extending through aligned and spaced-apart apertures in aluminum fairing strips and the opposite margins of the coverings and threadedly engaging interiorly threaded, tubular rivets attached at spaced-apart positions to the upper and lower rearward portions of the leading edges of the wings, the coverings being generally installed in a condition of strtech between the attaching margins. It has been found somewhat difficult and rather laborious, especially under the stretched condition, to maintain the fairing strips and the margins in their desired relative positions with their apertures in alignment with one another and the tubular rivets, while at the same time inserting the screw fasteners through the apertures and screwing the fasteners into engagement with the rivets. The attachment and the detachment of the coverings to and from the wings has required the expenditure of an objectionable number of man-hours of labor and sometimes the use of special tools, in addition to special constructions of the attaching margins.

An object of the invention is to provide for overcoming the foregoing and other difficulties and disadvantages of the prior attachments of the coverings.

Other objects of the invention are to provide improved separable fastening apparatus for and method of attaching a structure or body to a wall; to provide an improved driving rivet of the spring-engagement type; to provide for resilient, frictional engagement of the respective parts of the fastening apparatus; to provide for convenient engagement of the parts together with preventing accidental disengagement of said parts; to provide for the quick engagement and disengagement of said parts and for the attachment and detachment of the structure to and from the wall in a quickly releasable manner by operation from one side or face only of the wall; to provide for the engagement of said parts coincidental with the attachment of the structure to the wall under the action of a driving blow upon the apparatus at such face of the wall; to provide for simplicity of construction, convenience of manufacture and installation, and for effectiveness of operation.

These and other objects and advantages of the invention will be apparent from the following description.

In the accompanying drawings which form a part of this specification and in which like numerals are employed to designate like parts throughout the same, Fig. 1 is a front perspective view from above of separable fastening apparatus attaching an inflatable covering to the leading edge of an aircraft wing and constructed in accordance with and embodying the invention, parts being in section and broken away, Fig. 2 is a sectional view on an enlarged scale taken along line 2—2 of Fig. 1 parts being broken away, and Fig. 3 is a view showing a driving rivet for the fastening apparatus before assembly thereof.

In the illustrative embodiment of the invention shown in the drawings, the construction includes separable fastening apparatus 10 for attaching a structure or body 14 to a wall 20. For the arrangement shown, the apparatus 10 is disposed in engaged relation to the wall 20 at each of a plurality of spanwise spaced-apart positions, indicated by the numerals 11, 11, located at the chordwise spaced-apart, upper 12 and lower 13 attaching margins of an inflatable, ice-removing covering 14. The covering 14 may be of resilient rubber or other rubber-like material 15 having desirably therein a woven-textile, fabric reinforcement 16 of cotton, silk, glass or other suitable fibres, and a plurality of inflatable tubes 18, 19 of suitable reinforced rubber-like material extending spanwise. The apparatus 10 also engages the margins 12, 13 so that the covering is mounted upon and securely attached to the wall 20 of the leading edge of an airfoil 21 such, for example, as an aircraft wing. The construction of the attachment of each position 11 being the same, only the structure at one position of the upper marginal attachment will be described in detail.

The separable fastening apparatus 10 has a hollow, wall-engaging member 22, preferably a tubular rivet, disposed in the aperture 23 of and attached to the wall 20 of the leading edge, which wall may be of thin, stiff sheet material of aluminum alloy, magnesium alloy or other suitable metal material with the margin 24 of the aperture 23 dimpled or countersunk, as shown especially in Fig. 2. The apparatus 10 in the assembled, attached condition has a driving rivet or retaining pin 25 of spring material such, for example, as steel, phosphor bronze or other suitable hard, spring material separably secured to the structure or covering 14 and disposed in the bore 26 of the tubular rivet 22 in separably engaged relation to the latter.

The hollow wall-engaging member or rivet 22 is made desirably of light, strong, ductile material such as aluminum alloy, although it may be made of steel, copper or a suitable alloy. The tubular rivet may be of any suitable hollow type, it being preferred, however, to utilize a rivet such as is described and claimed in Patent No. 2,149,199, Harry E. Waner, Tubular Rivet, dated February 28, 1939. Such a rivet comprises in general a tubular body having a seating portion or wall-engaging flange 27 at one end, which may be of the countersunk, headed type for a flush mounting with the face 20a of the wall at the dimpled margin 24. The rivet has an interiorly threaded end portion 28 at its other end and spaced-apart from the flange 27, and the open end of the body at the flange 27 is counterbored to reduce the wall thickness as compared to that of the threaded portion 28 and provide an outwardly collapsible, cylindrical portion 29.

The tubular rivet 22, when in its upset condition and attached to the wall 20, has the portion 29 outwardly bulged at the other face 20b of the wall providing attaching means for mounting the rivet on the wall, whereby the thin wall 20 is clamped between the flange 27 and the bulged portion 29 with the flanged open end of the rivet 22 at the face 20a and the threaded end portion 28 projecting beyond the wall at the other face 20b. The upsetting of the rivet is accomplished by operation from the face 20a only of the wall for which purpose there may be employed a suitable tool such as is described and claimed in Patent No. 2,069,907, Harry E. Waner, Apparatus for Installing Tubular Rivets, dated February 9, 1937. The rivet is threadedly engaged with the tool, then inserted into the aperture 23 with the flange 27 against the outer surface or face 20a, after which the rivet is shortened by axially applied endwise pressure so as to collapse the portion 29 thereby forming a flange on each face of the metal wall. The tool is then disengaged and withdrawn from the rivet.

The driving rivet 25 of the separable fastening apparatus 10 has at one end of its elongated body a seating portion or an annular flange 30 of suitable form such, for example, as flat, tapered, semi-spherical or other desired shape. The driving rivet includes a cylindrical or intermediate portion 31 extending axially away from the flange 3 to a divided end portion 32 spaced-apart from the flanged end. The intermediate portion 31 has a continuous annular wall and is desirably solid throughout its extent for strength purposes.

The solid intermediate portion 31 is disposed in part in the bore 26 of the tubular rivet in snug fitting, bracing relation to the wall thereof at the flange 27 and at part of the portion 29 inwardly of the flange 27. The intermediate portion 31 also projects axially outward beyond the flange 27 and has desirably an annular retaining groove 33 intermediate its length and spaced-apart from the flange 30, the spacing being sufficient to accommodate the thickness of the margin of the covering 14, as shown especially in Fig. 2.

A peripherally-discontinuous element or spring ring 34 of suitable spring material desirably constitutes a part of the driving rivet and seats in the retaining groove 33, which may have a width substantially equal to or greater than the thickness of the ring 34, to firmly clamp and hold the margin 12 of the covering 14 between the flange 30 and the ring 34 adjacent the face 20a of the wall 20, which ring also seats against the flange 27 of the tubular rivet in the attached condition of the apparatus 10. The spring ring has an internal diameter less than that of the cylindrical portion 31 and greater than that at the bottom of the groove for resiliently seating in the latter. When the width of the groove exceeds the thickness of the ring, the arrangement facilitates accommodating variations in thickness of the margin of the covering and the attachment of the ring to the driving rivet.

The divided end portion 32 is desirably of bifurcated form providing a pair of engaging prongs 35, 36 joined at the solid portion 31 and extending axially or longitudinally therefrom in the disassembled condition in diverging relation to one another in the direction away from the flange 30, as shown especially in Fig. 3, for engaging the wall of the threaded end portion 28 in the assembled condition while partially sprung toward one another, as shown especially in Fig. 2. The bifurcated end portion 32 may be of reduced diameter relative to that of the cylindrical portion 31 and of a maximum diameter not exceeding that of the minor diameter of the threads of the portion 28 of the tubular rivet.

The bifurcated end portion has desirably an enlargement at its free end providing enlarged or bulbous portions 37, 38 at the ends of the prongs 35, 36, which portions project beyond and engage the end face of the portion 28 of the tubular rivet for preventing accidental separation of the latter and the driving rivet. Each portion 37, 38 may be of the bulbed form shown or other suitable shape and may have one or a plurality of axially spaced-apart, transversely-extending ridges 39, 40 facing generally toward the flange 30 so that at least one or more ridges of each portion 37, 38 directly engages such end face of the portion 28 to further assure retaining the rivets 22, 25 in attached relation. The oppositely sloping, inner ridged surfaces of the portions 37, 38 together with the enlarged construction makes possible the engagement of the portions 37, 38 with the end face of the portion 28 while accommodating variations in length of the rivet 22 in the upset condition, as well as variations in thickness of the covering 14 and in the fastener overall length from the outer face of the covering to the end face of the portion 28 of the upset rivet 22. This is advantageous to accommodate differences in dimensions of the respective parts of the assembly, especially in applications of coverings to aircraft wings as described herein and shown in the drawings.

The overall transverse extent of the bulbous portions, when the prongs are sprung close together, is substantially equal to the diameter of the bore 26 at the end portion 28 of the tubular rivet so as to permit the insertion of the prongs into the bore at the flange 27 and driving the driving rivet into the tubular rivet. For the unsprung remote condition of the prongs, as shown especially in Fig. 3, the overall transverse extent of the bulbous portions substantially exceeds the diameter of the bore 26 for facilitating the engagement with and the pressing against the threads of the wall of the end portion 28 by the prongs inwardly of the bulbous portions in the assembled relation of the rivets 22, 25.

The prongs 35, 36 in the assembled condition of the fastening apparatus 10 resiliently press against and frictionally engage the threaded wall of the end portion 28 along the major part of the length of the latter by virtue of their partially sprung disposition in the bore of the tubular rivet 22, and thus make possible separably holding the rivets 22, 25 together so as to mount the covering 14 upon the leading edge.

The construction and arrangement of the hereinabove described separable fastening apparatus facilitates the provision of a simplified construction of the attaching margins of the covering, wherein the necessity of independent aluminum fairing strips is avoided. Each margin, 12 for example, has the underlying fabric reinforcement 16 folded upon itself and over and around a flat bead 41 of flat, strip metal material such, for example, as steel and united with the overlying rubber-like material 15 of the covering. The rubber-like material 15 extends rearwardly of the bead 41 and tapers to a thin edge providing a fairing portion 42 integral with the remainder of the covering.

In the operation of the separable fastening apparatus after the tubular rivets have been attached to the leading edge at the desired positions, holes are punched in the attaching margins at the forward sides of the beads so as to match the spacing of the tubular rivets. The driving rivets with their prongs sprung in close relation are inserted into the holes so that their flanges seat against the outer surfaces of the margins and then the spring rings are seated in the retaining grooves at the inner surfaces of the margins. Next the driving rivets with their prongs in close relation are inserted in the bores of the tubular rivets at the respective margins from the face 20a of the leading edge wall and forced or driven into engagement with the tubular rivets along the margins as by axial pressure of the operator's thumb or the blow of a hammer. The attachment of one margin may be completed before attaching the other.

The tendency of the prongs to spread in the attached and assembled condition of the fastening apparatus and the engagement of the ridges 39, 40 of the bulbous portions with the end faces of the tubular rivets will securely hold the driving rivets in place yet permit separation of the apparatus for removal of the covering 14, when desired.

The covering may be removed from its installed condition on the wing by applying outward force to the covering at its margins as by pulling force exerted thereon by the operator or by a prying force exerted by a tool upon the exposed flanges of the driving rivets so as to disengage the same from the tubular rivets. Such outward axial force causes the prongs to be sprung together in the close relation in spite of the sloping ridged surfaces of the bulbous portions.

Variations may be made without departing from the scope of the invention as it is defined in the following claims.

We claim:

1. A fastener for releasably attaching sheet material to apertured work by operation from one side only of the work, said fastener comprising a member for mounting in the aperture and having a bore therein and including means for securing the member to the work, a headed retaining pin comprising a shank having an annular groove therein spaced-apart from the head of said pin, and a split ring for seating in said groove to clamp the sheet material between said head and said ring, said shank being of divided form comprising spaced-apart elements of spring material which in their unstressed condition are of an overall width greater than said bore for outward springing into engagement with said member when said shank is forced into said bore from said side of the work with the sheet material clamped between said head and said ring.

2. A fastener for releasably attaching sheet material to apertured work by operation from one side only of the work, said fastener comprising a headed rivet for mounting in the aperture and having an internally threaded bore therein and including means for securing the rivet to the work, a headed retaining pin comprising a shank having an annular groove therein spaced-apart from the head of said pin, and a split ring for seating in said groove to clamp the sheet material between said head and said ring, said shank being of divided form comprising spaced-apart elements of spring material which in their unstressed condition are of an overall width greater than said bore for outward springing into gripping engagement with a thread of said bore when said shank is forced therein with the sheet material clamped between said head and said ring at said side of the work.

3. A fastener for releasably attaching sheet material to an apertured wall by operation from one side only of the wall, said fastener comprising a headed rivet for mounting in the aperture of the wall with the head seating against said side of the wall, said rivet having an outwardly collapsible wall portion extending from said head for engaging the other side of the wall and an internally threaded bore through the rivet, a retaining pin comprising a flange at one end thereof and a shank having an annular groove therein spaced-apart from said flange, and a split ring for seating in said groove to clamp the sheet material between said flange and said ring, said shank being of a diameter snugly fitting said bore at said head and terminating in an end portion of divided form beyond said groove comprising spaced-apart elements of spring material, said elements in their unstressed condition having an overall width greater than said bore for outward springing against the rivet when said shank is forced into said bore with the sheet material clamped between said flange and said ring at said side of the wall, each element having at its free end a series of serrations each for engaging a thread at the end of said rivet at a corresponding depth of insertion of said shank in said bore.

WILLIAM R. TONGE.
RAY H. GILL.

REFERENCES CITED

The following references are of record in the file of this patent:

UNITED STATES PATENTS

| Number | Name | Date |
|---|---|---|
| 773,795 | Joseph | Nov. 1, 1904 |
| 829,359 | Weidmuller | Aug. 21, 1906 |
| 1,338,883 | Tarkington | May 4, 1920 |
| 1,393,139 | Kiesel | Oct. 11, 1921 |
| 1,491,394 | Griffith et al. | Apr. 22, 1924 |
| 1,830,460 | Berge | Nov. 3, 1931 |
| 1,978,087 | Johnson | Oct. 23, 1934 |
| 2,120,530 | Shippee et al. | June 14, 1938 |
| 2,149,199 | Waner | Feb. 28, 1939 |
| 2,376,089 | Savageau | May 15, 1945 |